United States Patent
Chen et al.

(10) Patent No.: US 11,520,698 B2
(45) Date of Patent: Dec. 6, 2022

(54) DATA STORAGE DEVICE IN A KEY-VALUE STORAGE ARCHITECTURE WITH DATA COMPRESSION, AND NON-VOLATILE MEMORY CONTROL METHOD

(71) Applicant: Shannon Systems Ltd., Shanghai (CN)

(72) Inventors: Chao Chen, Shanghai (CN); Ningzhong Miao, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 197 days.

(21) Appl. No.: 17/133,910

(22) Filed: Dec. 24, 2020

(65) Prior Publication Data
US 2021/0216448 A1    Jul. 15, 2021

(30) Foreign Application Priority Data
Jan. 9, 2020    (CN) .......................... 202010022952.9

(51) Int. Cl.
*G06F 12/02* (2006.01)
*G06F 3/06* (2006.01)

(52) U.S. Cl.
CPC .......... *G06F 12/0253* (2013.01); *G06F 3/064* (2013.01); *G06F 3/0608* (2013.01); *G06F 3/0679* (2013.01); *G06F 2212/1044* (2013.01); *G06F 2212/401* (2013.01); *G06F 2212/702* (2013.01); *G06F 2212/7205* (2013.01)

(58) Field of Classification Search
None
See application file for complete search history.

(56) References Cited

U.S. PATENT DOCUMENTS

| | | |
|---|---|---|
| 4,064,489 A | 12/1977 | Babb |
| 8,169,825 B1 | 5/2012 | Shalvi et al. |
| 10,521,399 B1 | 12/2019 | Ben-Tsion |
| 10,732,884 B1 | 8/2020 | Gupta et al. |
| 2013/0036278 A1 | 2/2013 | Strzelczak et al. |
| 2013/0326189 A1 | 12/2013 | Cilibrasi et al. |

(Continued)

FOREIGN PATENT DOCUMENTS

| | | |
|---|---|---|
| CN | 101956606 A | 1/2011 |
| CN | 103516369 A | 1/2014 |

(Continued)

OTHER PUBLICATIONS

SlimCache: Exploiting Data Compression Opportunities in Flash-based Key-value Caching (Year: 2018).*

(Continued)

*Primary Examiner* — Jared I Rutz
*Assistant Examiner* — Marwan Ayash
(74) *Attorney, Agent, or Firm* — McClure, Qualey & Rodack, LLP

(57) ABSTRACT

A key-value storage architecture with data compression is shown. During the garbage collection, the controller compresses valid pieces of key-value data to generate a piece of compressed data. Each piece of key-value data is in key-value format. The controller codes the piece of compressed data to generate a first piece of compressed key-value data that is also in key-value format, and programs the first piece of compressed key-value data into the non-volatile memory.

18 Claims, 9 Drawing Sheets

(56) References Cited

U.S. PATENT DOCUMENTS

| | | | |
|---|---|---|---|
| 2015/0067286 A1* | 3/2015 | Colgrove | G06F 3/0688 |
| | | | 711/162 |
| 2016/0196207 A1 | 7/2016 | Gupta et al. | |
| 2016/0350007 A1 | 12/2016 | Choi et al. | |
| 2017/0147664 A1 | 5/2017 | Bussler et al. | |
| 2017/0185625 A1* | 6/2017 | Cheru | G06F 16/217 |
| 2017/0212680 A1* | 7/2017 | Waghulde | G06F 3/0644 |
| 2019/0018598 A1 | 1/2019 | Hung | |
| 2019/0102232 A1 | 4/2019 | Wang et al. | |
| 2019/0188289 A1 | 6/2019 | Suzuki et al. | |
| 2019/0266081 A1* | 8/2019 | Gupta | G06F 3/0659 |
| 2019/0332329 A1 | 10/2019 | Qui et al. | |

FOREIGN PATENT DOCUMENTS

| | | | |
|---|---|---|---|
| CN | 104008134 A | 8/2014 |
| CN | 106202138 A | 12/2016 |
| CN | 106649530 A | 5/2017 |
| CN | 108446363 A | 8/2018 |
| CN | 108667725 A | 10/2018 |
| CN | 109254926 A | 1/2019 |
| CN | 110413592 A | 11/2019 |
| WO | 2018/016804 A1 | 1/2018 |

OTHER PUBLICATIONS

Non-Final Office Action dated Dec. 9, 2021, issued in U.S. Appl. No. 17/163,739.

\* cited by examiner

DATA STORAGE DEVICE IN A KEY-VALUE STORAGE ARCHITECTURE WITH DATA COMPRESSION, AND NON-VOLATILE MEMORY CONTROL METHOD

CROSS REFERENCE TO RELATED APPLICATIONS

This Application claims the priority of China Patent Applications No. 202010022952.9, filed on Jan. 9, 2020, the entirety of which is incorporated by reference herein.

BACKGROUND OF THE INVENTION

Field of the Invention

The present invention relates to the control of non-volatile memory, and particularly relates to the data compression of a key-value storage architecture and the upgrade of the data compression algorithm.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Each non-volatile memory has its own special storage characteristics, so that special designs are required to operate and manage the various non-volatile memories.

BRIEF SUMMARY OF THE INVENTION

An improved technology is applied to a key-value storage architecture in the present invention, which performs data compression during garbage collection. To compress data and release storage space at the same time. A smooth upgrade procedure for the data compression algorithm is also proposed.

A data storage device in accordance with an exemplary embodiment of the present invention includes a non-volatile memory and a controller. The controller is coupled to the non-volatile memory, and is configured to perform garbage collection on the non-volatile memory to free up space. During the garbage collection, the controller collects and compresses valid pieces of key-value data to generate a piece of compressed data. Each piece of key-value data that is collected is in key-value format. The controller codes the piece of compressed data to generate a first piece of compressed key-value data that is also in key-value format, and programs the first piece of compressed key-value data into the non-volatile memory.

In an exemplary embodiment, the key-value format includes a mark field. In the first piece of compressed key-value data, a mark field is filled with a compression symbol. In the collected pieces of key-value data, every mark field is filled with an uncompressed symbol.

In an exemplary embodiment, the key-value format further includes a prefix field, a key field, and a responding-value field. In the first piece of compressed key-value data, a key field is filled with a dummy key, and the responding-value field is filled with the piece of compressed data.

In an exemplary embodiment, the controller arranges the collected pieces of key-value data according to a special format to generate a piece of special-format data. The special-format data further includes position information indicating the locations of the collected pieces of key-value data arranged in the special-format data.

In an exemplary embodiment, the controller manages mapping information in a mapping information translation layer that maps a plurality of keys to the non-volatile memory. The first piece of compressed key-value data is programmed into the non-volatile memory as indicated by a first physical address. The controller updates the mapping translation layer to record the first physical address as mapping information of keys of the collected pieces of key-value data.

In an exemplary embodiment, one key among the keys of the collected pieces of key-value data is a target key. In response to a read request for a target responding value corresponding to the target key, the controller obtains the first physical address from the mapping information translation layer, reads the first piece of compressed key-value data from the non-volatile memory according to the first physical address, recognizes the compression symbol in the mark field of the first piece of compressed key-value data, decompresses the compressed data contained in the first piece of compressed key-value data to get the special-format data, and extracts the target responding value from the special-format data.

In an exemplary embodiment, according to the position information contained in the special-format data, the controller obtains the collected pieces of key-value data from the special-format data, compares the keys recorded in the collected pieces of key-value data with the target key to obtain a matching key, and regards a responding value corresponding to the matching key as the target responding value.

In an exemplary embodiment, for each key of the collected pieces of key-value data, an index value is recorded in the mapping information translation layer. The controller checks the position information contained in the special-format data according to an index value that is recorded in the mapping information translation layer for the target key, and thereby obtains the location of a target piece of key-value data in the special-format data. The controller extracts the target responding value from the target piece of key-value data.

In an exemplary embodiment, the length of the compressed data corresponding to the collected pieces of key-value data is recorded in the mapping information translation layer. The controller decompresses the compressed data due to the non-zero value of the length.

In an exemplary embodiment, a first compression algorithm is annotated in the responding-value field of the first piece of compressed key-value data.

In an exemplary embodiment, as annotated in the responding field of the first piece of compressed key-value data, decompression corresponding to the first compression algorithm is performed, and a piece of source key-value data is obtained from the decompression. The piece of source key-value data is combined with some other pieces of source key-value data, and then compressed according to a second compression algorithm for an update from the first compression algorithm to the second compression algorithm, and then coded to generate a second piece of compressed key-value data that is in key-value format, and then programmed into the non-volatile memory as indicated by a second physical address for garbage collection. The second compression algorithm is annotated in the responding-value field of the second piece of compressed key-value data.

The forgoing controller operating the non-volatile memory may be implemented in other structures. In an exemplary embodiment, a control method for non-volatile memory with the aforementioned concept is proposed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called an eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

The flash memory has its own special storage characteristics, which are described below.

Figure 1:
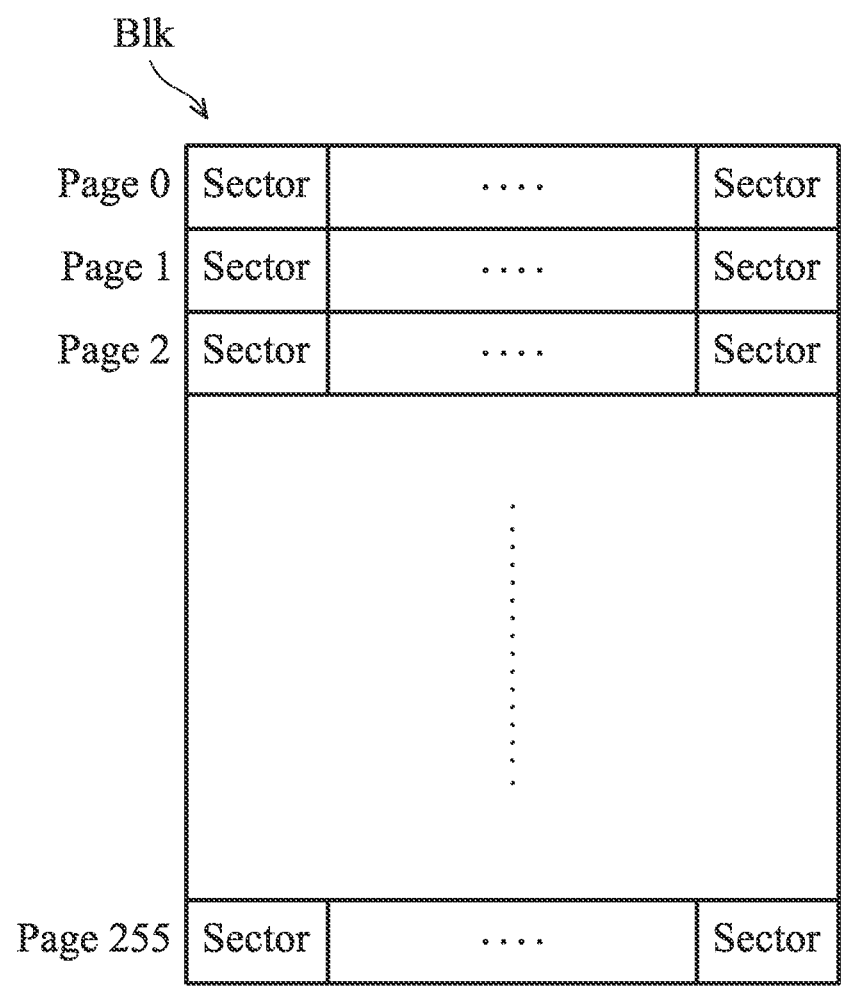
FIG. 1 illustrates the structure of a block Blk of a flash memory.

The physical space of flash memory is divided into a plurality of blocks to be allocated for storage of data. FIG. 1 illustrates the structure of a block Blk of a flash memory. Each block Blk includes a plurality of pages, for example, page 0 . . . page 255. Each page includes a plurality of sectors, such as 32 sectors. Each sector can store 512B of user data. In an exemplary embodiment, data is programmed into one block from the lower page number to the higher page number. In some exemplary embodiments, the flash memory is accessed through multiple channels. The blocks accessed in parallel through the multiple channels are treated as a super block, and the pages accessed in parallel through the multiple channels are treated as a super page. Data is programmed into one super block from the lower numbered super page to the higher numbered super page. The multi-channel architecture can improve data throughput. The following examples can all be applied in the multi-channel architecture.

Especially, the data update of the flash memory is not overwritten to the storage space of the old data. The updated data must be programmed into the blank space, and the old data is invalidated. An erasure operation is required to release the invalidated space. When the spare blocks are gradually consumed to be less than a threshold amount, there is a demand for garbage collection. The valid data in source blocks are collected to a spare space through garbage collection. The blocks with only invalid data remained are released and can be used again after the erasure operation. The spare space can be made up by garbage collection to ensure the normal use of flash memory.

The present invention proposes a technology to be applied to a data storage device that is in a key-value storage architecture. In the key-value storage architecture, each piece of key-value data includes a key and a responding value. Each piece of key-value data is accessed when the key is called. The key preferably has a fixed length, for example, 32 bytes. Each key corresponds to a responding value whose length is preferably not fixed. The host can output a write command to program the key and the responding value to a data storage device based on the key-value storage architecture (e.g., a key-value SSD). After that, the host can issue a read command to issue a key to read the flash memory and thereby a responding value corresponding to the issued key is read from the flash memory.

Figure 2:
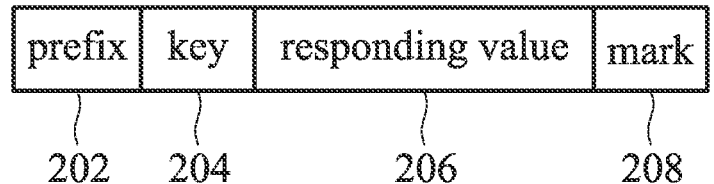
FIG. 2 illustrates a key-value format 200 in accordance with an exemplary embodiment of the present invention.

FIG. 2 illustrates a key-value format 200 in accordance with an exemplary embodiment of the present invention, which includes a prefix field 202, a key field 204, a responding-value field 206, and a mark field 208. The prefix field 202 may has a fixed length, for example, 16 bytes. The length or the format code of the key-value format 200 may be recorded in the prefix field 202. The key representing the key-value data KV is stored in the key field 204, and the responding value corresponding to the key is stored in the responding-value field 206. The mark field 208 may have a fixed length, such as 1 byte.

Figure 3:
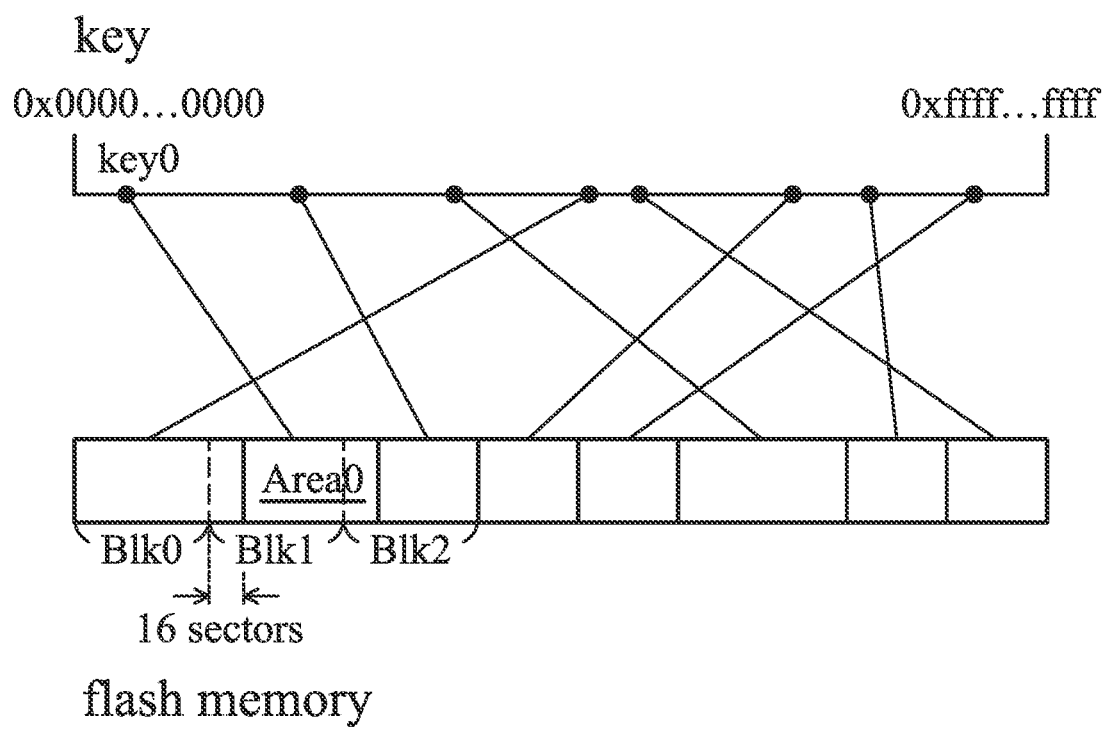
FIG. 3 illustrates how the keys map to the physical space of flash memory.

FIG. 3 illustrates how the keys map to the physical space of flash memory. A flash translation layer (FTL) needs to be established in the data storage device or at the host side according to the key-value storage architecture. In the flash translation layer, a key-value mapping table (storing mapping information) is dynamically updated to map the different keys to the different areas of the flash memory. For each piece of key-value data, the recorded mapping information preferably indicates a starting block and records an offset. As shown, a key, key0, is mapped to a flash area, Area0, that starts from a block, Blk1, with an offset of 4096 bytes (i.e., an offset of 16 sectors). The flash area Area0 is partially provided by block Blk1 and partially provided by block Blk2.

Figure 4:
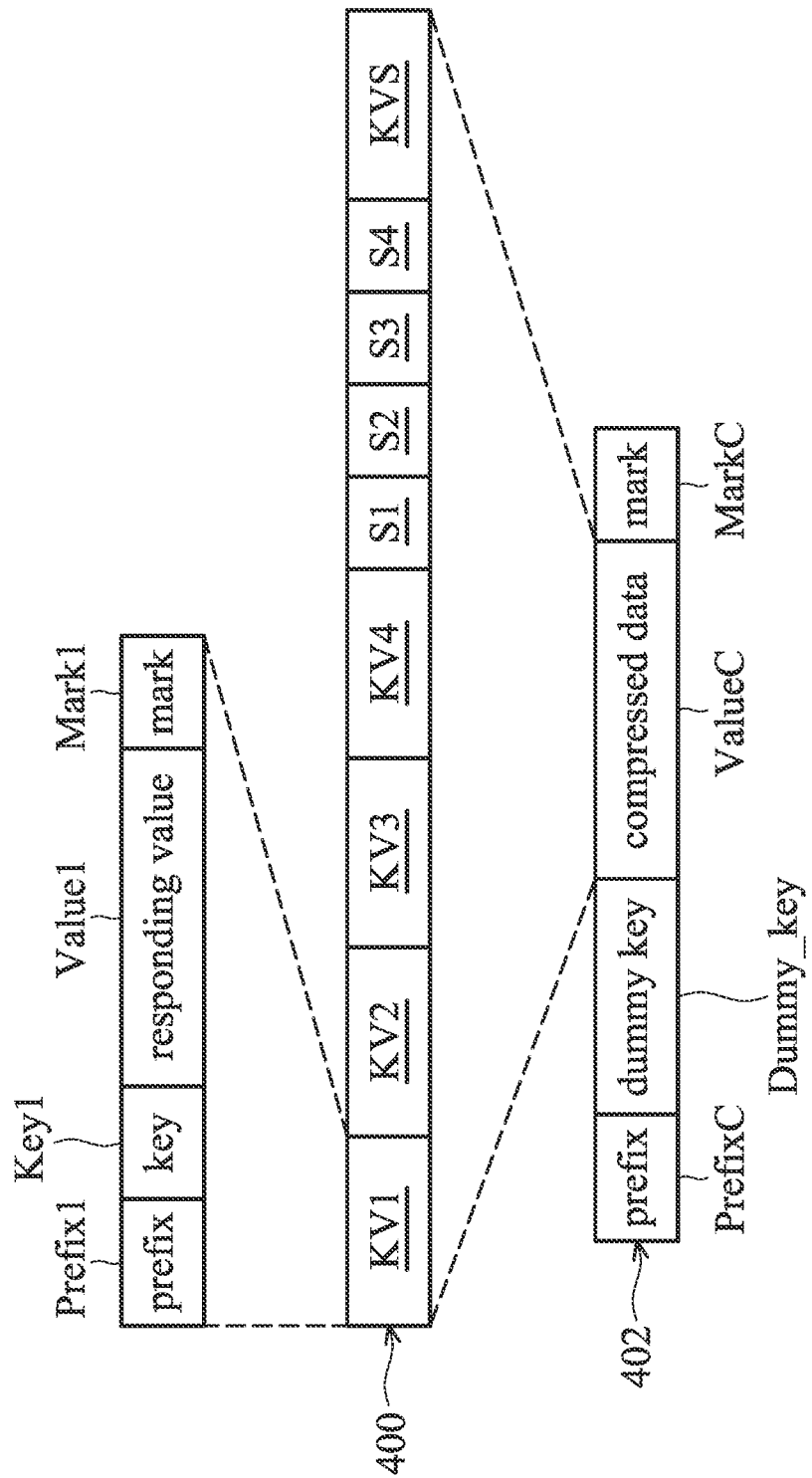
FIG. 4 depicts an example of data compression performed during garbage collection in accordance with an exemplary embodiment of the present invention.
Figure 5:
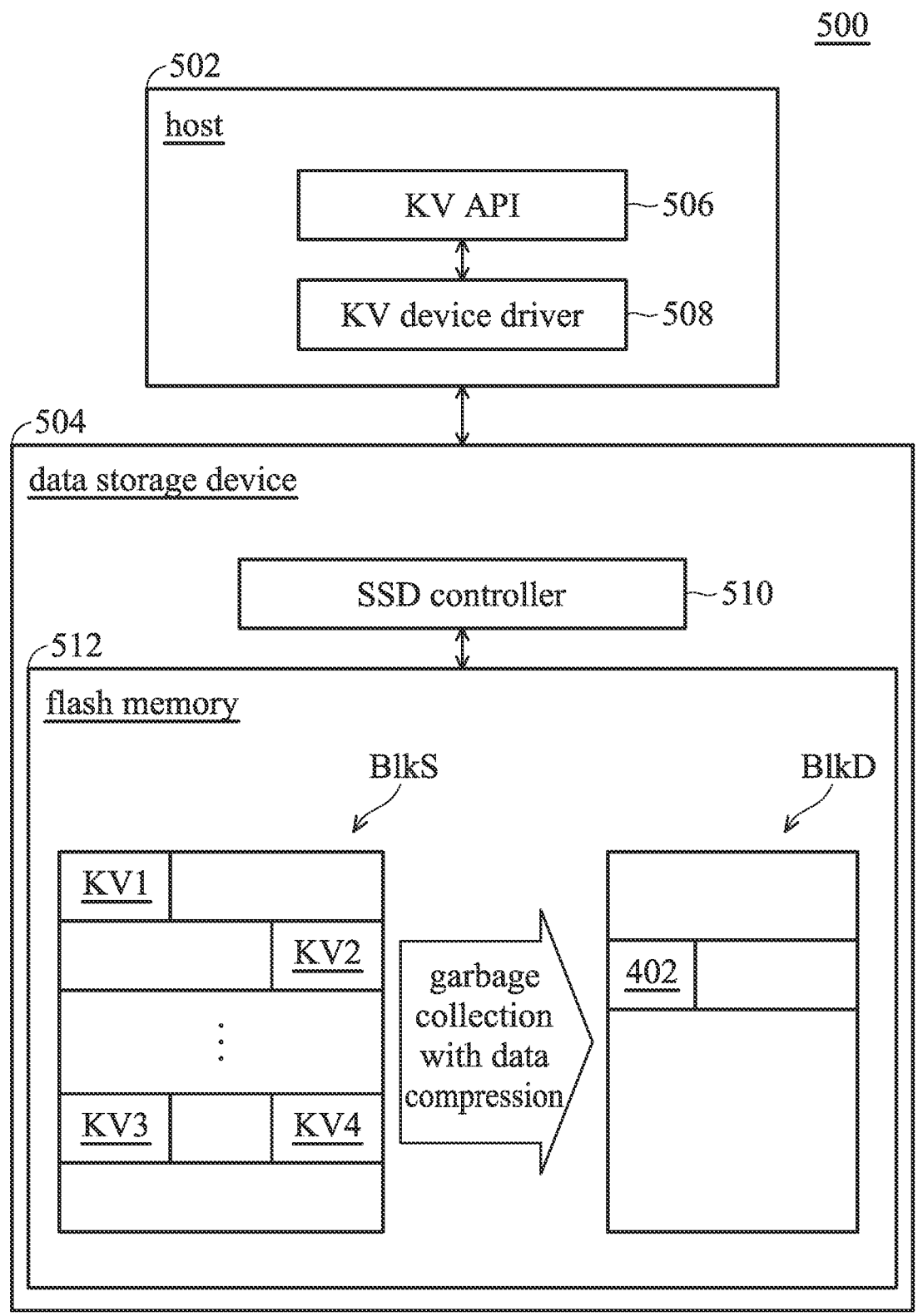
FIG. 5 is a block diagram depicting a data storage system 500 in accordance with an exemplary embodiment of the present invention.

A data storage device in the key-value storage architecture also needs garbage collection. After all valid data of a source block is collected to a destination space, the source block can be released. In the present invention, the garbage collection further involves data compression. The compressed data still follows the aforementioned key-value data format 200. Note that the data compression performed during garbage collection does not change the logic of garbage collection, nor does it change the format of the key-value mapping table. In an exemplary embodiment, the data compression is based on Snappy algorithm (not limited thereto). FIG. 4 depicts the data compression of the present invention. FIG. 5 shows the hardware architecture of the present invention.

FIG. 5 is a block diagram of a data storage system 500. The data storage system 500 includes a host 502 and a data storage device 504, and the data storage device 504 is preferably a key-value SSD. A key-value application programming interface 506 is established at the host 502 side to communicate with users. In response to the users, the key-value application programming interface 506 outputs application commands to a key-value device driver 508 and, accordingly, the key-value device driver 508 drives the data storage device 504. The data storage device 504 mainly includes an SSD controller 510 and a flash memory 512. The SSD controller 510 operates the flash memory 512 as requested by the host (through the key-value device driver 508). When no host command is received, the data storage device 504 enters an idle state, and the SSD controller 510 is available to perform the garbage collection with data compression. Technically, the garbage collection with data compression is performed in background.

Figure 6:
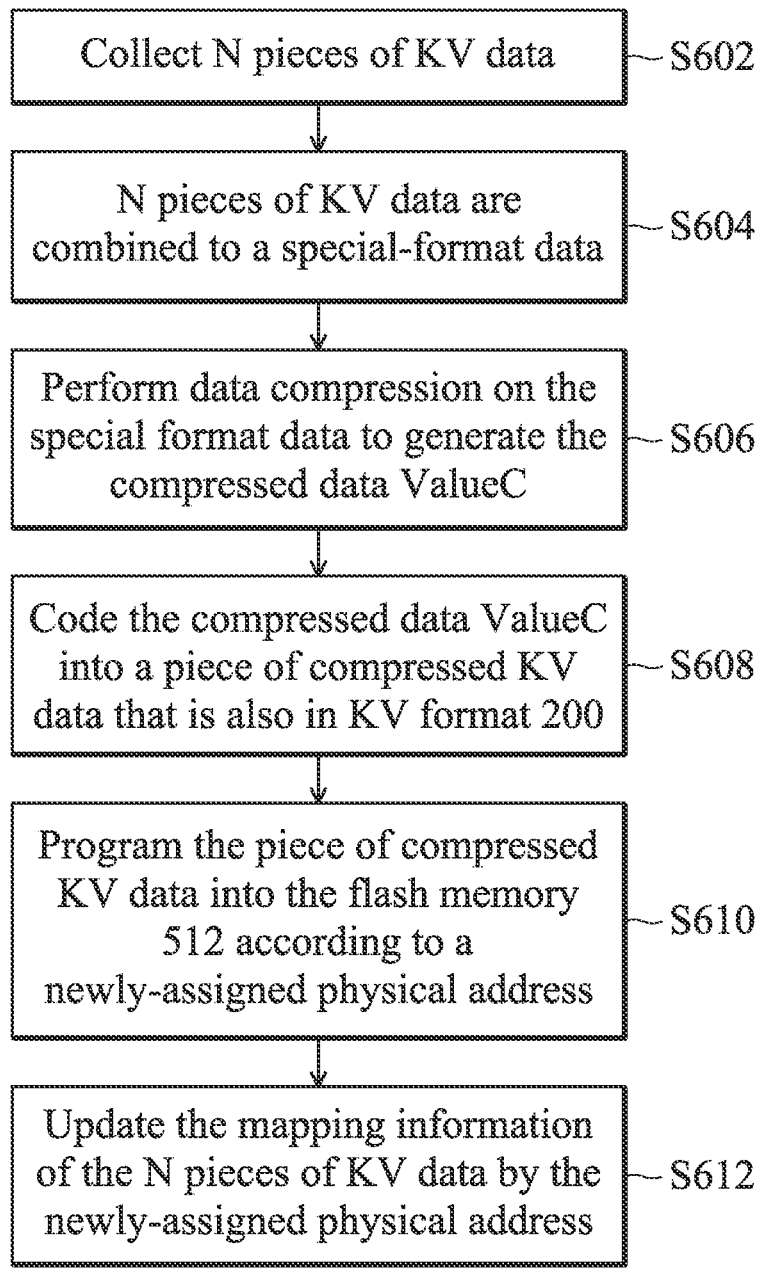
FIG. 6 is a flowchart depicting a garbage collection procedure in accordance with an exemplary embodiment of the present invention.

FIG. 4 illustrates the data compression performed during garbage collection in accordance with an exemplary embodiment of the present invention, and the description further refers to the flowchart of FIG. 6. In step S602, N pieces of key-value data are collected. For example, the SSD controller 510 reads four (N=4) valid pieces of key-value data, KV1 to KV4, from a source block of the flash memory 512. KV1 to KV4 each record a key and a responding value in the KV data format 200. As shown in FIG. 4, the key-value data KV1 includes a prefix Prefix1, a key Key1, a responding value Vlaue1 and a mark Mark1. Similarly, following the KV data format 200, a key Key2 and a responding value Vlaue2 are contained in the key-value data KV2, a key Key3 and a responding value Vlaue3 are contained in the key-value data KV3, and a key Key4 and a responding value Vlaue4 are contained in the key-value data KV4. The keys Key1~Key4 are preferably continuous but not limited thereto. In the other examples, the keys Key1~Key4 are non-continuous keys.

In step S604, the N pieces of key-value data are combined to a special-format data 400. The special-format data 400 includes the N pieces of key-value data and some additional information. The SSD controller 510 attaches additional information S1~S4 and kvs at the end of the combined four pieces of key-value data KV1~KV4. S1, S2, S3, S4, and kvs each has a fixed length. The number of key-value data collected in the special-format data 400 is recorded as kvs, i.e., kvs=4. S1 to S4 shows where to extract the four pieces of key-value data KV1 to KV4 from the data 400. S1 shows the starting address of KV1, i.e., the starting address of the special-format data 400. S2 is preferably an offset between the starting address of KV2 and the starting address of the special format data 400, and the offset len(KV1) can be estimated by len(Prefix1)+len(Key1)+len(Value1)+len(Mark1), where len( ) is a length function. S3 is preferably an offset between the starting address of KV3 and the starting address of the special format data 400, and the offset can be len(KV1)+len(KV2). S4 is preferably an offset between the starting address of KV4 and the starting address of the special format data 400, and the offset can be len(KV1)+len(KV2)+len(KV3).

In step S606, data compression is performed on the special format data 400 to generate the compressed data ValueC. For example, the SSD controller 510 compresses the special format data 400 to generate the compressed data ValueC.

In step S608, the compressed data ValueC is coded into a piece of compressed key-value data that is also in key-value format 200. For example, the SSD controller 510 generates the compressed key-value data 402 in the key-value data format 200 to include the compressed data ValueC. The compressed key-value data 402 includes a compression prefix PrefixC, a dummy key Dummy_key, the compressed data ValueC, and a compression symbol MarkC. The compression prefix PrefixC is 16 bytes, similar to the prefix field 202, is provided to record the length or the format code of the compressed key-value data 402. The dummy key Dummy_key is 32 bytes, and its value can be a default value (or the other predefined value). The compression symbol MarkC is 1 byte, different from the uncompressed symbol recorded in the mark field 208 of the collected key-value data KV1 to KV4.

In step S610, the compressed key-value data 402 is programmed into the flash memory 512 according to a newly-assigned physical address. For example, the SSD controller 510 programs the compressed key-value data 402 to a destination block of garbage collection.

In step S612, the mapping information of the N pieces of key-value data is updated by the newly-assigned physical address. For example, the SSD controller 510 updates the mapping information of all the key-value data KV1 to KV4 to the newly-assigned physical address, which is the starting address storing the compressed key-value data 402.

In an exemplary embodiment, the mapping information further indicates the length of each piece of key-value data. After the garbage collection with data compression, the length information of each piece of the key-value data KV1 to KV4 is updated to the equal to the length of the compressed key-value data 402.

Figure 7:
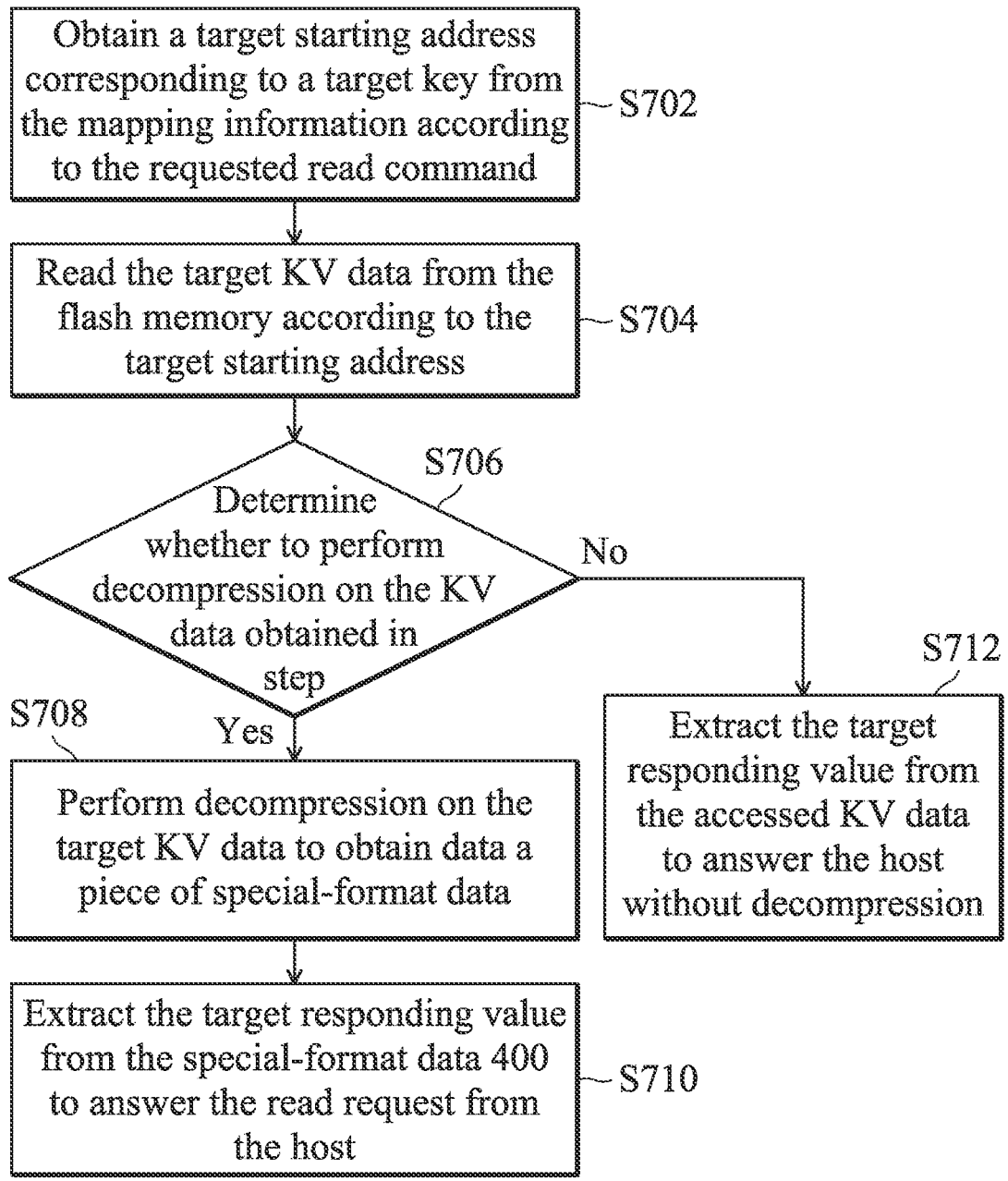
FIG. 7 is a flowchart illustrating how a data storage device in the key-value storage architecture responds to a read command from a host in accordance with an exemplary embodiment of the present invention.

Since the mapping information has been updated, the SSD controller 510 will respond to a read command from the host according to the updated mapping information. FIG. 7 is a flowchart illustrating how a data storage device in the key-value storage architecture responds to a read command from a host in accordance with an exemplary embodiment of the present invention.

In step S702, a target starting address corresponding to a target key is obtained from the mapping information according to the requested read command. For example, when receiving a data read command, such as get(Key4), which requests to read a responding value corresponding to a key Key4, the SSD controller 510 searches a key-value mapping table and thereby obtains the target starting address corresponding to Key4. The target starting address is the starting address of the compressed key-value data 402.

In step S704, the target key-value data is read from the flash memory according to the target starting address. For example, the SSD controller 510 starts the reading of the flash memory 5121 from the target starting address and interprets the read data according to the key-value format 200 that includes a prefix field 202, a key field 204, a responding-value field 206 and a mark field 208. When the target to be read is the compressed key-value data 402, the compression prefix PrefixC, the dummy key Dummy_Key, the compressed data ValueC, and the compression symbol MarkC of the compressed key-value data 402 are read from the flash memory 512 by step S704.

In step S706, it is determined whether to perform decompression on the key-value data obtained in step S704. If yes, step S708 is performed, otherwise, step S712 is performed. For example, the SSD controller 510 may check the mark field 208 or the compression symbol MarkC to determine whether data decompression on the target key-value data is required.

In step S708, decompression is performed on the target key-value data to obtain data a piece of special-format data. For example, the SSD controller 510 decompresses the compressed data Value_C extracted from the compressed key-value data 402, and thereby gets the special-format data 400 that includes the four pieces of key-value data KV1 to KV4 and the additional information S1~S4 and kvs.

In step S710, the target responding value is extracted from the special-format data 400 to answer the read request from the host 502. For example, the SSD controller 510 may sequentially reads the four pieces of key-value data KV1 to KV4 from the special-format data 400, and then returns the responding value Value4 corresponding to the key Key4 to the host 502. The SSD controller 510 may read the attached information S1~S4 prior to the key-value data accessing. According to the attached information S4, the SSD controller 510 obtains the starting address of the key-value data KV4 to get the responding value Value4 corresponding to Key4, and then returns the responding value Value4 to the host 502.

When it is determined in step S706 that decompression is not required, step S712 is performed. In step S712, the target responding value is extracted from the accessed key-value data without decompression, and is returned to the host 502. For example, the SSD controller 510 reads a responding value from a piece of uncompressed key-value data that is in the KV format 200 and returns the responding value to the host 502.

In an exemplary embodiment, for each key related to the compressed data ValueC, an index value Key_Index is recorded in the key-value mapping table. For example, the SSD controller 510 records that an index value Key_Index related to the key Key4 is 4. According to the index value Key_Index that is 4, the attached information S4 is read from the special-format data 400. According to S4, the key-value data KV4 is read from the special-format data 400. From the key-value data KV4, the responding value Value4 corresponding to the key Key4 is obtained.

In an exemplary embodiment, the length ValueC length of the compressed data ValueC is recorded in the key-value mapping table corresponding to the keys related to the compressed data ValueC. In an exemplary embodiment, 16 KB special-format data 400 is compressed to 8 KB compressed data ValueC. The key-value mapping table records, corresponding to each of the keys Key1~Key4, the length ValueC length as 8 KB. In response to a read request, e.g., get(Key4), the key-value mapping table is searched and the length value, 8 KB, is obtained from the key-value mapping table. Because the length value ValueC length is non-zero, the SSD controller 510 determines that data decompression is required and there is no need to check the mark field for the compression symbol. After data decompression, the special-format data 400 is obtained. The responding value Value4 corresponding to the key Key4 is obtained from the special-format data 400. The compression symbol MarkC contained in the compressed key-value data 402 may simply deal with the sudden power-off recovery (SPOR) procedure, which is read for the reconstruction of the key-value mapping table.

Figure 8:
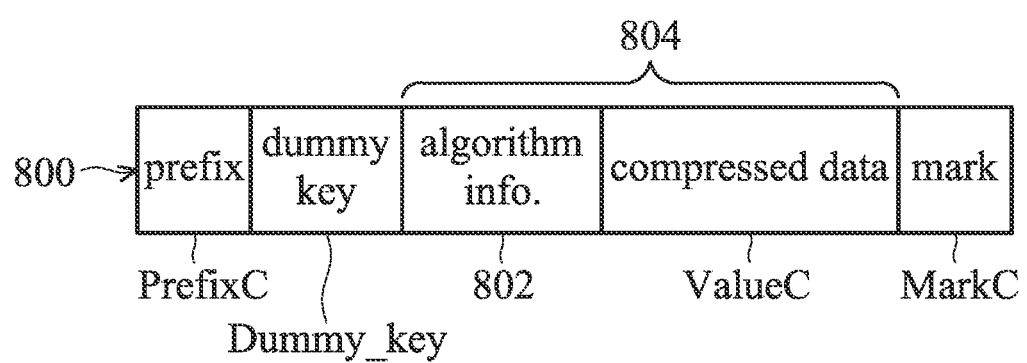
FIG. 8 illustrates a piece of compressed key-value data 800 in key-value format 200 in accordance with another exemplary embodiment of the present invention.

In an exemplary embodiment, the version information of the compression algorithm is attached in front of or at the end of the compressed data ValueC. FIG. 8 illustrates a piece of compressed key-value data 800 in key-value format 200 in accordance with another exemplary embodiment of the present invention. The version information 802 of the adopted compression algorithm is combined with the compressed data ValueC to form a value 804. When the compression algorithm is upgraded, the garbage collection procedure may recognize the old compression algorithm from the version information 802, decompress the compressed data ValueC according to the old compression algorithm to obtain pieces of key-value data, combine the valid pieces of key-value data decompressed from the compressed data ValueC with the other valid pieces of key-value data, and compress the combined pieces of key-value by the new compression algorithm. The newly-compressed data is combined with the version information (802) of the new compression algorithm, and coded into the key-value format 200 to be programmed into a spare space (the destination space of garbage collection) to complete the garbage collection procedure. In this manner, there is no need to design any additional decompression and compression procedures to update the compression algorithm. The upgrade of compression algorithm is applied to the entire flash memory by garbage collection that is performed in the background. As time goes by, the background garbage collection will unify all compressed data to the new compression algorithm.

In an exemplary embodiment, the version information 802 may include a type information compress_type and a version number compress_version. The type information compress_type shows the type of the compression algorithm (for example, Snappy or the others). The version number compress_version shows what generation the adopted compression algorithm is.

Figure 9A:
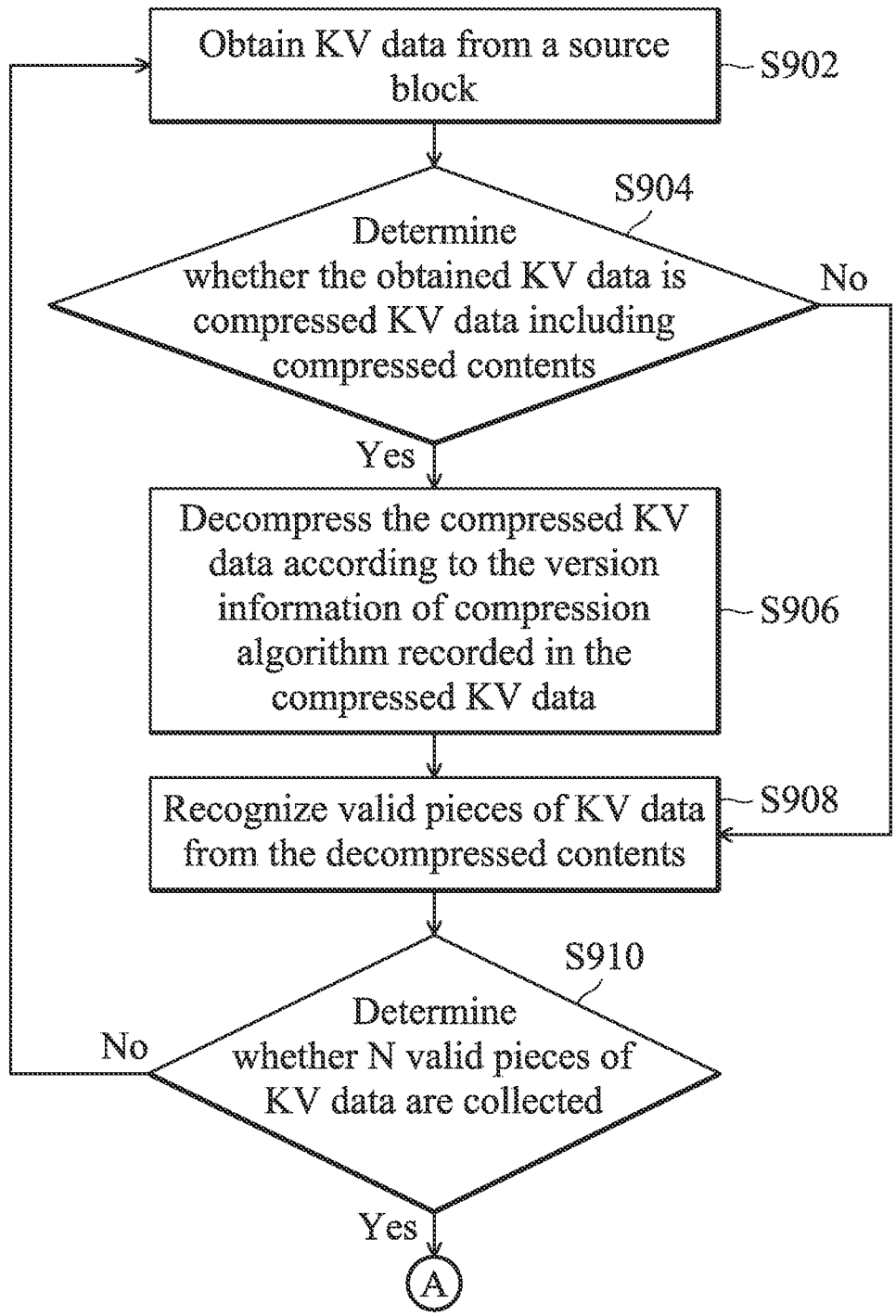
FIG. 9A and FIG. 9B are flowcharts illustrating a garbage collection technique in which a smooth upgrade of the compression algorithm is achieved.
Figure 9B:
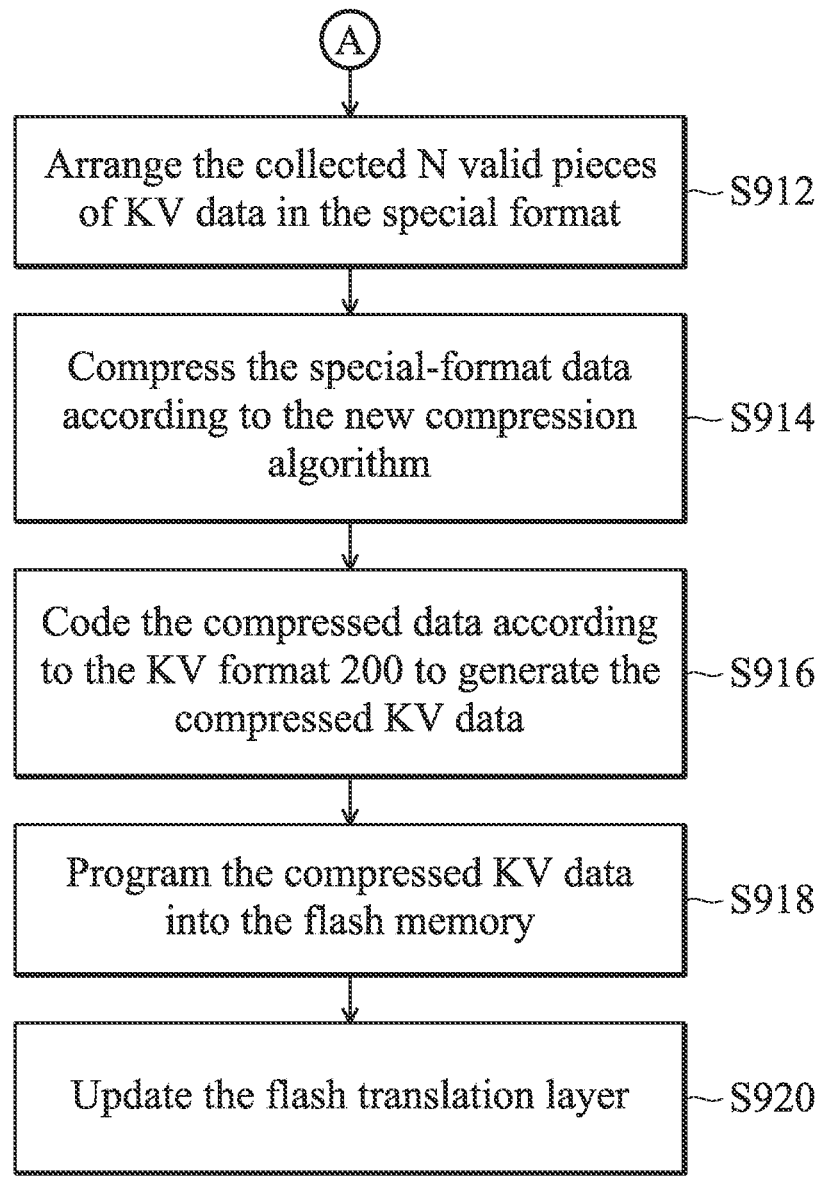

FIG. 9A and FIG. 9B are flowcharts illustrating a garbage collection technique in which a smooth upgrade of the compression algorithm is achieved.

Referring to FIG. 9A, step S902 is performed to obtain key-value data from a source block. Step S904 is performed to determine whether the obtained key-value data is compressed key-value data including compressed contents. If yes, step S906 is performed to decompress the compressed key-value data according to the version information of compression algorithm recorded in the compressed key-value data. If no, the decompression step S906 is skipped. In step S908, valid pieces of key-value data are recognized from the decompressed contents. In step S910, it is determined whether N valid pieces of key-value data are collected. If not, the procedure continues to collect the valid pieces of key-value data from the source block. If yes, the remaining steps shown in FIG. 9B are performed. In step S912, the collected N valid pieces of key-value data are arranged in the special format (e.g. referring to the special-format data 400). In step S914, the special-format data is compressed according to the new compression algorithm. In step S916, the compressed data is coded according to the key-value format 200 to generate the compressed key-value data 800. The version information of the new compression algorithm is coded in the field 802. In step S918, the compressed key-value data 800 is programmed into the flash memory 512. In step S920, the flash translation layer is updated.

The controller operating the flash memory may be modified in the architecture. Any key-value format based on the aforementioned concept falls within the scope of the present invention. The aforementioned concept may be used to realize non-volatile memory control methods.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, coupled to the non-volatile memory, and configured to perform garbage collection on the non-volatile memory,
wherein:
during the garbage collection, the controller compresses valid pieces of key-value data to generate a piece of compressed data;
each piece of key-value data is in a key-value format; and
the controller codes the piece of compressed data to generate a first piece of compressed key-value data that is also in key-value format, and programs the first piece of compressed key-value data into the non-volatile memory;
wherein:
the key-value format includes a mark field;
in the first piece of compressed key-value data, a mark field is filled with a compression symbol;
in the collected pieces of key-value data, every mark field is filled with an uncompressed symbol;
the key-value format further includes a prefix field, a key field, and a responding-value field; and
in the first piece of compressed key-value data, a key field is filled with a dummy key, and the responding-value field is filled with the piece of compressed data.

2. The data storage device as claimed in claim 1, wherein:
the controller arranges the collected pieces of key-value data according to a special format to generate a piece of special-format data;
the special-format data further includes position information indicating locations of the collected pieces of key-value data arranged in the special-format data.

3. The data storage device as claimed in claim 2, wherein:
in a mapping information translation layer, the controller manages mapping information that maps a plurality of keys to the non-volatile memory;
the first piece of compressed key-value data is programmed into the non-volatile memory as indicated by a first physical address; and the controller updates the mapping translation layer to record the first physical address as mapping information of keys of the collected pieces of key-value data.

4. The data storage device as claimed in claim 3, wherein:
one key among the keys of the collected pieces of key-value data is a target key;
in response to a read request for a target responding value corresponding to the target key, the controller obtains the first physical address from the mapping information translation layer, reads the first piece of compressed key-value data from the non-volatile memory according to the first physical address, recognizes the compression symbol in the mark field of the first piece of compressed key-value data, decompresses the compressed data contained in the first piece of compressed key-value data to get the special-format data, and extracts the target responding value from the special-format data.

5. The data storage device as claimed in claim 4, wherein:
according to the position information contained in the special-format data, the controller obtains the collected pieces of key-value data from the special-format data, compares the keys recorded in the collected pieces of key-value data with the target key to obtain a matching key, and regards a responding value corresponding to the matching key as the target responding value.

6. The data storage device as claimed in claim 4, wherein:
for each key of the collected pieces of key-value data, an index value is recorded in the mapping information translation layer; and
the controller checks the position information contained in the special-format data according to an index value that is recorded in the mapping information translation layer for the target key, and thereby obtains a location for a target piece of key-value data in the special-format data; and
the controller extracts the target responding value from the target piece of key-value data.

7. The data storage device as claimed in claim 4, wherein:
length of the compressed data corresponding to the collected pieces of key-value data is recorded in the mapping information translation layer; and
the controller decompresses the compressed data due to the length having a non-zero value.

8. The data storage device as claimed in claim 1, wherein:
a first compression algorithm is annotated in the responding-value field of the first piece of compressed key-value data.

9. The data storage device as claimed in claim 8, wherein:
as annotated in the responding field of the first piece of compressed key-value data, decompression corresponding to the first compression algorithm is performed, and a piece of source key-value data is obtained from the decompression;
the piece of source key-value data is combined with some other pieces of source key-value data, and then compressed according to a second compression algorithm for an update from the first compression algorithm to the second compression algorithm, and then coded to generate a second piece of compressed key-value data that is in key-value format, and then programmed into the non-volatile memory as indicated by a second physical address for garbage collection; and
the second compression algorithm is annotated in the responding-value field of the second piece of compressed key-value data.

10. A non-volatile memory control method, comprising:
   performing garbage collection on a non-volatile memory; and
   during the garbage collection, compressing valid pieces of key-value data to generate a piece of compressed data, coding the piece of compressed data to generate a first piece of compressed key-value data that is in key-value format, and programming the first piece of compressed key-value data into the non-volatile memory,
   wherein each piece of key-value data is in key-value format,
   wherein:
   the key-value format includes a mark field;
   in the first piece of compressed key-value data, a mark field is filled with a compression symbol;
   in the collected pieces of key-value data, every mark field is filled with an uncompressed symbol;
   the key-value format further includes a prefix field, a key field, and a responding-value field; and
   in the first piece of compressed key-value data, a key field is filled with a dummy key, and the responding-value field is filled with the piece of compressed data.

11. The non-volatile memory control method as claimed in claim 10, further comprising:
   arranging the collected pieces of key-value data according to a special format to generate a piece of special-format data,
   wherein the special-format data further includes position information indicating the locations of the collected pieces of key-value data arranged in the special-format data.

12. The non-volatile memory control method as claimed in claim 11, further comprising:
   managing mapping information in a mapping information translation layer to map a plurality of keys to the non-volatile memory; and
   when the first piece of compressed key-value data is programmed into the non-volatile memory as indicated by a first physical address, updating the mapping translation layer to record the first physical address as mapping information of keys of the collected pieces of key-value data.

13. The non-volatile memory control method as claimed in claim 12, wherein:
   one key among the keys of the collected pieces of key-value data is a target key; and
   in response to a read request for a target responding value corresponding to the target key, the first physical address is obtained from the mapping information translation layer, the first piece of compressed key-value data is read from the non-volatile memory according to the first physical address, the compression symbol in the mark field of the first piece of compressed key-value data is recognized, the compressed data contained in the first piece of compressed key-value data is decompressed to get the special-format data, and the target responding value is extracted from the special-format data.

14. The non-volatile memory control method as claimed in claim 13, further comprising:
   according to the position information contained in the special-format data, obtaining the collected pieces of key-value data from the special-format data, comparing the keys recorded in the collected pieces of key-value data with the target key to obtain a matching key, and regarding a responding value corresponding to the matching key as the target responding value.

15. The non-volatile memory control method as claimed in claim 13, wherein:
   for each key of the collected pieces of key-value data, an index value is recorded in the mapping information translation layer; and
   the position information contained in the special-format data is checked according to an index value that is recorded in the mapping information translation layer for the target key, and thereby the location of a target piece of key-value data in the special-format data is obtained; and
   the target responding value is extracted from the target piece of key-value data.

16. The non-volatile memory control method as claimed in claim 13, wherein:
   the length of the compressed data corresponding to the collected pieces of key-value data is recorded in the mapping information translation layer; and
   the compressed data is decompressed due to the non-zero value of the length.

17. The non-volatile memory control method as claimed in claim 10,
   wherein:
   a first compression algorithm is annotated in the responding-value field of the first piece of compressed key-value data.

18. The non-volatile memory control method as claimed in claim 17, wherein:
   as annotated in the responding field of the first piece of compressed key-value data, decompression corresponding to the first compression algorithm is performed, and a piece of source key-value data is obtained from the decompression;
   the piece of source key-value data is combined with some other pieces of source key-value data, and then compressed according to a second compression algorithm for an update from the first compression algorithm to the second compression algorithm, and then coded to generate a second piece of compressed key-value data that is in key-value format, and then programmed into the non-volatile memory as indicated by a second physical address for garbage collection; and
   the second compression algorithm is annotated in the responding-value field of the second piece of compressed key-value data.

* * * * *